United States Patent
Jain

(10) Patent No.: US 8,595,477 B1
(45) Date of Patent: Nov. 26, 2013

(54) SYSTEMS AND METHODS FOR REDUCING HANDSHAKE DELAY IN STREAMING PROTOCOL WEB REQUESTS

(75) Inventor: Arvind Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/071,084

(22) Filed: Mar. 24, 2011

(51) Int. Cl.
*H04L 29/06* (2006.01)

(52) U.S. Cl.
USPC .......................................... 713/151; 709/227

(58) Field of Classification Search
USPC .............. 726/8, 22, 23, 3; 713/168, 172, 151; 709/227–229
See application file for complete search history.

(56) References Cited

U.S. PATENT DOCUMENTS

| | | | |
|---|---|---|---|
| 7,058,718 B2 * | 6/2006 | Fontes et al. | 709/228 |
| 7,653,703 B2 * | 1/2010 | Toumura et al. | 709/217 |
| 7,675,854 B2 * | 3/2010 | Chen et al. | 370/230.1 |
| 8,200,957 B1 * | 6/2012 | Mukerji et al. | 713/151 |
| 8,239,670 B1 * | 8/2012 | Kaufman et al. | 713/151 |
| 2004/0098229 A1 * | 5/2004 | Error et al. | 702/186 |
| 2005/0166049 A1 * | 7/2005 | Touitou et al. | 713/170 |
| 2012/0227088 A1 * | 9/2012 | Gao | 726/3 |

* cited by examiner

*Primary Examiner* — Beemnet Dada
(74) *Attorney, Agent, or Firm* — Sterne, Kessler, Goldstein & Fox P.L.L.C.

(57) ABSTRACT

Systems, methods and articles of manufacture for reducing or eliminating handshake delay caused in establishing a network connection are described herein. Embodiments disclosed relate to reducing or eliminating the delay cause in establishing a network connection that is caused by the traditional exchange of connection request and acknowledgement data segments performed each time a connection is established between two computers using a reliable streaming protocol such as TCP. Further embodiments allow a server in communication with one or more clients using a reliable streaming protocol to begin responding to requests from the clients immediately without having to wait for connection establishment by including in a connection request data segment a content request. In one embodiment, this is achieved by transmitting from the server to the client a persistent HTTP cookie after a first connection request from the client. Subsequent requests from that client will include a request for content and the cookie so that the server may verify the cookie and respond to the content request without the overhead of performing a full connection handshake.

19 Claims, 8 Drawing Sheets

Optimized

SYSTEMS AND METHODS FOR REDUCING HANDSHAKE DELAY IN STREAMING PROTOCOL WEB REQUESTS

FIELD

The field generally relates to web requests over computer networks and applications thereof.

BACKGROUND

In a computer network employing a reliable streaming protocol for data communication, also known as guaranteed delivery streaming protocols, before one computer on the network, such as a server, can deliver content to another computer on the network, a client, a connection must first be established according to the rules of the reliable streaming protocol. Once a connection is established, the server can receive a request for content from the client and deliver a response.

The process of establishing the connection requires performing a connection handshake that involves multiple transmissions of data segments across the network to verify connection privileges before any actual content data can be transmitted. Performing this handshake requires at least a fall round trip transmission of handshake data segments across the network. Even though bandwidth between clients and servers on computer networks, including the Internet, is ever increasing, this round trip time between two machines is fundamentally bounded by the speed of light and consumes a non-trivial amount of time and resources, particularly when aggregated across a large number of connections. As a result of these resource costs, which are incurred even when a particular client is a known or trusted client, network performance can be adversely impacted.

BRIEF SUMMARY

Disclosed herein are systems and methods relating to reducing or eliminating the delay caused in establishing a network connection by allowing a server in communication with a client using a reliable streaming protocol to begin responding to requests from the client immediately without having to wait for a connection handshake.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. These figures are intended to be illustrative, not limiting.

DETAILED DESCRIPTION

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments of the present invention relate to improving the performance of web requests over computer networks. In one embodiment, a server, such as a web server, email server, or file transfer server, implements an improved reliable stream protocol connection technique for speeding up web requests. In other embodiments, a client, such as web browser, email client application, or file transfer application, implements improved reliable stream protocol connection techniques for speeding up web requests. The connection request techniques described herein can be an improvement over aspects of conventional reliable stream protocols such as Transmission Control Protocol ("TCP").

Figure 1:
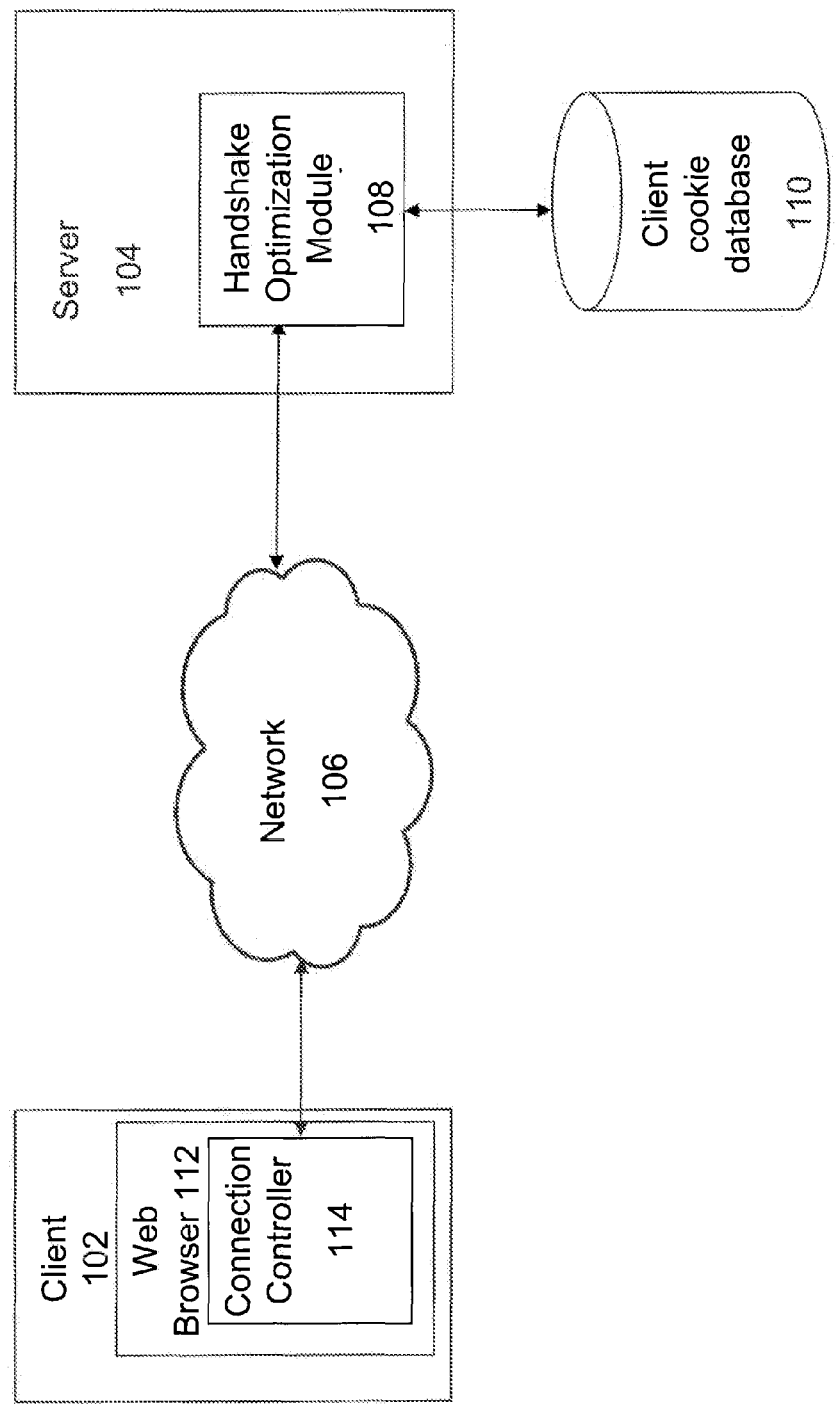
FIG. 1 illustrates a client server architecture, according to one embodiment.

FIG. 1 illustrates a client-server network system 100, according to an embodiment. One or more clients 102 connect to a server 104 over a network 106. In some embodiments, the server 104 may include a handshake optimization module 108 according to the teachings of this disclosure, and the handshake optimization module 108 may be connected to a client cookie database 110. In some embodiments, client 102 may include a web browser 112 having a connection controller 114 for sending and receiving data over network 106. Other embodiments can include on server 104 a conventional web server, email server, or file transfer server modified according to the teachings in this disclosure. Client 102 can be a device that includes at least one processor, at least one memory, and at least one network interface. For example, client 102 can be implemented on a personal computer, handheld computer, personal digital assistant, smart phone, a mobile telephone, a game console, a set-top box, and the like.

Server 104 can be a device that includes at least one processor, at least one memory, and at least one network interface. For example, server 104 may include a web server such as the Google Web Server from Google Inc., Apache Web Server from the Apache foundation, Internet Information Services from Microsoft, and the like.

Database 110 can be implemented in any form of hardware storage device (e.g., hard disk, tape storage, etc.) or can be a workstation, computer, cluster of computers, set-top box, or other device having at least one processor. In an embodiment, and as shown in FIG. 1, database 110 may be located separately from server 104. In another non-limiting embodiment, database 110 may be connected to a w'red and/or wireless network (not shown) that enables server 104 to communicate with database 110 across network 106.

Network 106 may include one or more networks, such as the Internet. In some examples, network 106 can include one or more wide area networks (WAN) or local area networks (LAN). Network 106 can include one or more network technologies such as Ethernet, Fast Ethernet, Gigabit Ethernet, a variant of the IEEE 802.11 standard such as WiFi, and the like. Communication over network 106 takes place using one or more network communication protocols including reliable streaming protocols such as TCP. These examples are illustrative and not intended to limit the present invention.

Client 102 and server 104 may be in data communication over network 106 using a protocol such as TCP. TCP is a reliable streaming protocol, also known as guaranteed delivery protocol or connection-oriented protocol, where "reliable" and "guaranteed delivery" refer to the nature of the protocol to ensure data delivery. Reliable streaming protocols provide reliable, ordered delivery of a stream of bytes from one computer to another computer. Such protocols are "connection-oriented" in that handshaking is required to establish communication between, for example, client 102 and server 104. Reliable streaming protocols ensure data delivery by managing message transmission and acknowledgment, dropped data segment retransmission, and delivery timeout, among other things. Reliable streaming protocols can be contrasted with "simple" or "connectionless" transmission protocols that do not provide reliable delivery of data segments. One such example of a connectionless protocol is the User Datagram Protocol (UDP). In the UDP, there will be no indication whether a data segment sent to a recipient is lost during transmission.

Embodiments herein are described with reference to TCP as an exemplary reliable streaming protocol; however, it is within the knowledge of one skilled in the art to identify other reference reliable streaming protocols that are adaptable according to the teachings in this disclosure.

Traditional Mode of Operation

In traditional TCP operations between client 102 and server 104 over network 106, data segments or packets are transmitted over network 106 from, for example, server 104 to client 102. A TCP segment includes a header and a data section. The TCP header contains mandatory fields, including source destination ports and SYN and ACK fields. The SYN and ACK fields are used to request connections and acknowledge connection requests. The data section follows the header and its contents are the payload data carried by the segment. TCP communications between client 102 and server 104 may be divided into three phases. First, in a multi-step handshake process, a connection must be properly established between client 102 and server 104. Second, client 102 and server 104 will enter the data transfer phase. Third, after data transmission is completed, the connection termination phase operates to close established virtual circuits and releases all allocated resources.

Figure 2:
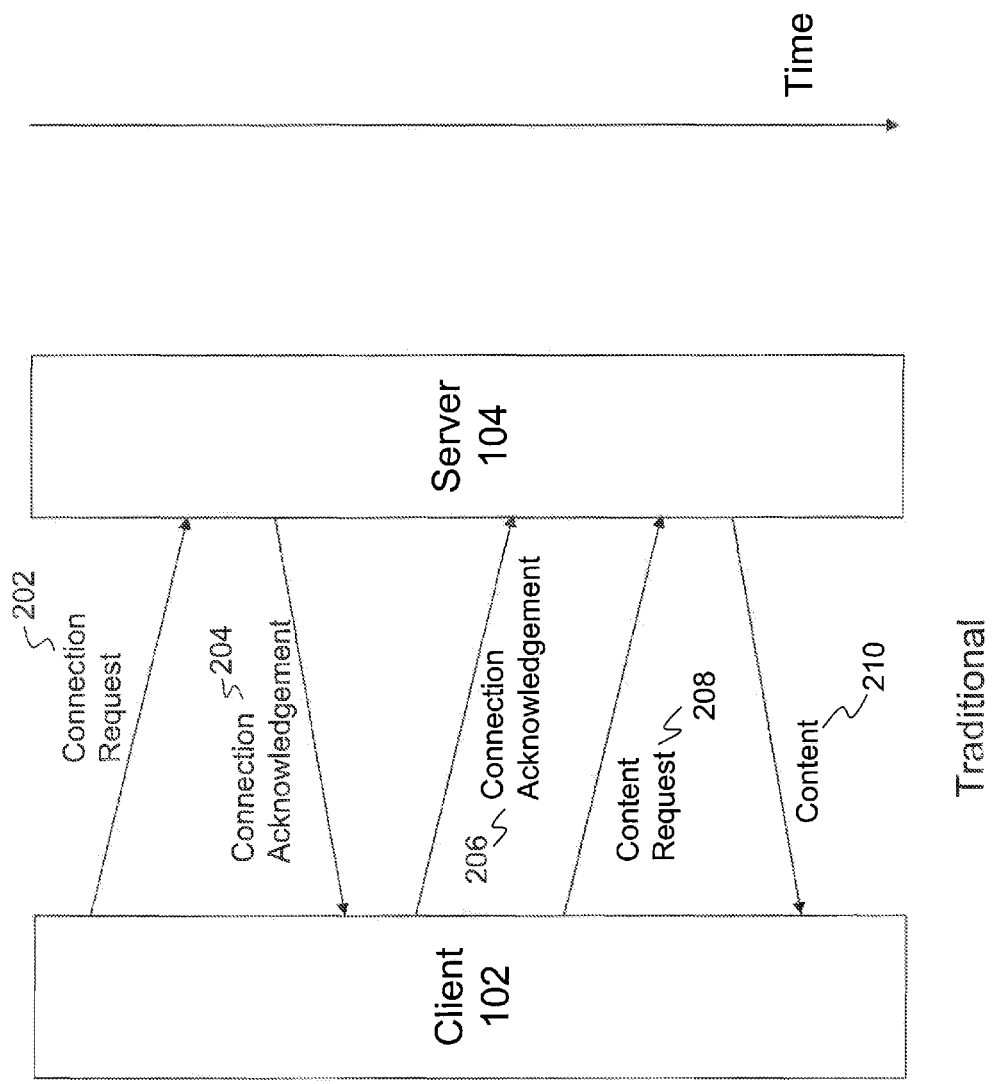
FIG. 2 illustrates a traditional client server handshake protocol.

Phases one and two of traditional operation are illustrated in FIG. 2, using the TCP as an example, showing the current exchange between client web browser 112, for example, and a web server 104 to allow downloading of a web page from server 104 to client 102:

1) Client web browser 112 of client 102 sends over network 106 a request to open a connection 202 in the form of a TCP SYN segment to web server 104 according to the protocol.
2) When the request to open a connection 202 is received by web server 104, web server 104 responds back over network 106 to client web browser 112 with an acknowledgement 204 in the form of a TCP SYN-ACK segment according to the protocol. A TCP SYN-ACK segment returned by server 104 both acknowledges the SYN received from client 102 and requests acknowledgement from client 102 of receipt of the SYN-ACK segment being transmitted.
3) When client web browser 112 receives the acknowledgement 204, it sends an acknowledgement over network 106 back to web server 104 in the form of a TCP ACK segment 206 according to the protocol.

At this point, the connection is considered established and operation can proceed into phase two:

4) Once the connection is established, client web browser 112 sends a request for content in the form of a TCP segment that contains an HTTP GET 208 according to the protocol to web server 104. The HTTP GET request 208 contains details of the web page being requested, including its URL.
5) Web server 104, upon receiving the HTTP GET segment 208, responds back over network 106 to client web browser 112 with the contents of the web page 210.

As a result of the multipart handshake required to establish this connection, it has taken at least three times the propagation delay of the path between client 102 and web server 104 to establish the connection. That is, before any content data could be transmitted in phase two, establishing a connecting according to phase one incurred a time delay resulting from three successive transmissions of data across the network.

Although bandwidth between clients 102 and servers 104 on the Internet is ever increasing, the network transmissions associated with establishing a connection between two computers still introduce a delay and incur a resource cost, particularly taken in aggregate.

Figure 3:
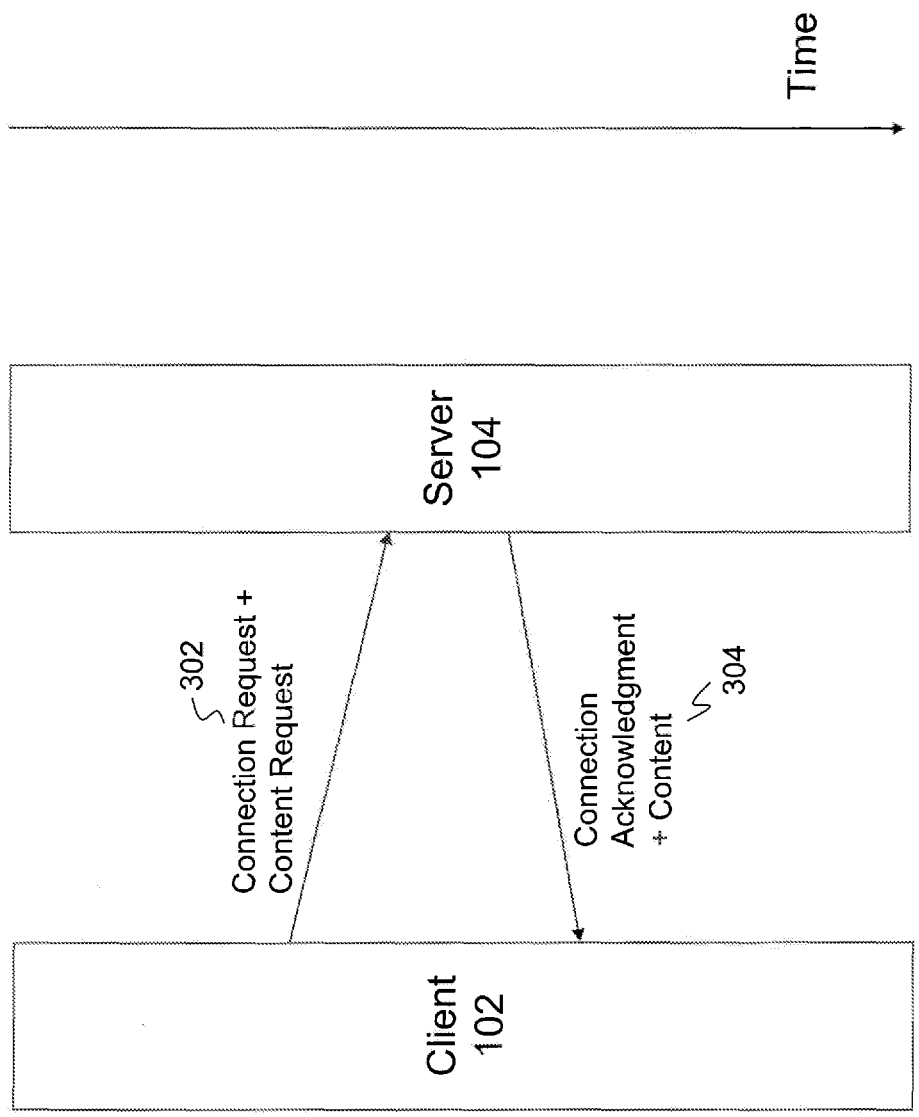
FIG. 3 illustrates a client server handshake protocol.

As illustrated in FIG. 3, the delay introduced by the handshake process can be avoided altogether by allowing server 104 to accept a combined connection request (SYN) and content request (HTTP GET) ("Connection+Content Request") 302 and immediately send back the content data and connection acknowledgment together 304. While this implementation is optimized for speed and avoids any delay introduced by the handshake process, such an implementation, without more, introduces at least two vulnerabilities, and is therefore an unprotected mode of operation.

In the first vulnerability, allowing server 104 to accept the Connection+Content Request 302 and return contents of a web page 304 without first completing a connection handshake makes server 104 vulnerable to denial of service attack. In a denial of service attack, a server is saturated with communication requests from one or more attackers such that the server's resources are occupied and the server cannot respond to legitimate communication requests. The traditional connection handshake of a reliable streaming protocol is useful for filtering out these types of attacks because no work is performed to generate and deliver content until the requesting client has been authenticated or verified. But when server 104 is implemented to respond to Connection+Content Requests 302 without first performing a connection handshake, an attacker can flood server 104 with spoofed Connection+Content Requests 302 causing server 104 to do a lot of work in generating responses 304 to each request. Parsing the HTTP GET request contained in the Connection+Content Request 302 and generating the response to the request can be a very expensive operation that consumes a lot of server resources. Spoofed Connection+Content Requests 302 provide the appearance to the server that the request is coming from a legitimate source, but because no handshake is performed whereby the source is verified or authenticated, the server 104 responds to the request. By requiring the handshake, in the current standard protocol implementations this problem is avoided, as server 104 will not perform any work in responding to a content request 208 until client 102 has completed the protocol handshake, thereby confirming the client's identity and ensuring its request is not spoofed.

In the second vulnerability, an attacker can create a Connection+Content Request 302 and send to server 104 wherein the requests are spoofed to make server 104 believe that the requests have come from a client 102 other than the attacker. In this case, the server can be tricked into sending a large web page load to the unsuspecting client, thereby potentially bringing down the network connection of the client. This is called amplification attack or reflected attack.

Embodiments disclosed herein address each of these vulnerabilities while still eliminating or reducing handshake delay. In one embodiment, server 104 includes a handshake optimization module 108 that handles an incoming Connection+Content Request 302 in a protected manner according to one of three modes of operation: (1) a "standard" mode; (2) an "optimized" mode; and (3) a "cookie" mode.

Standard Mode of Operation

Figure 4:
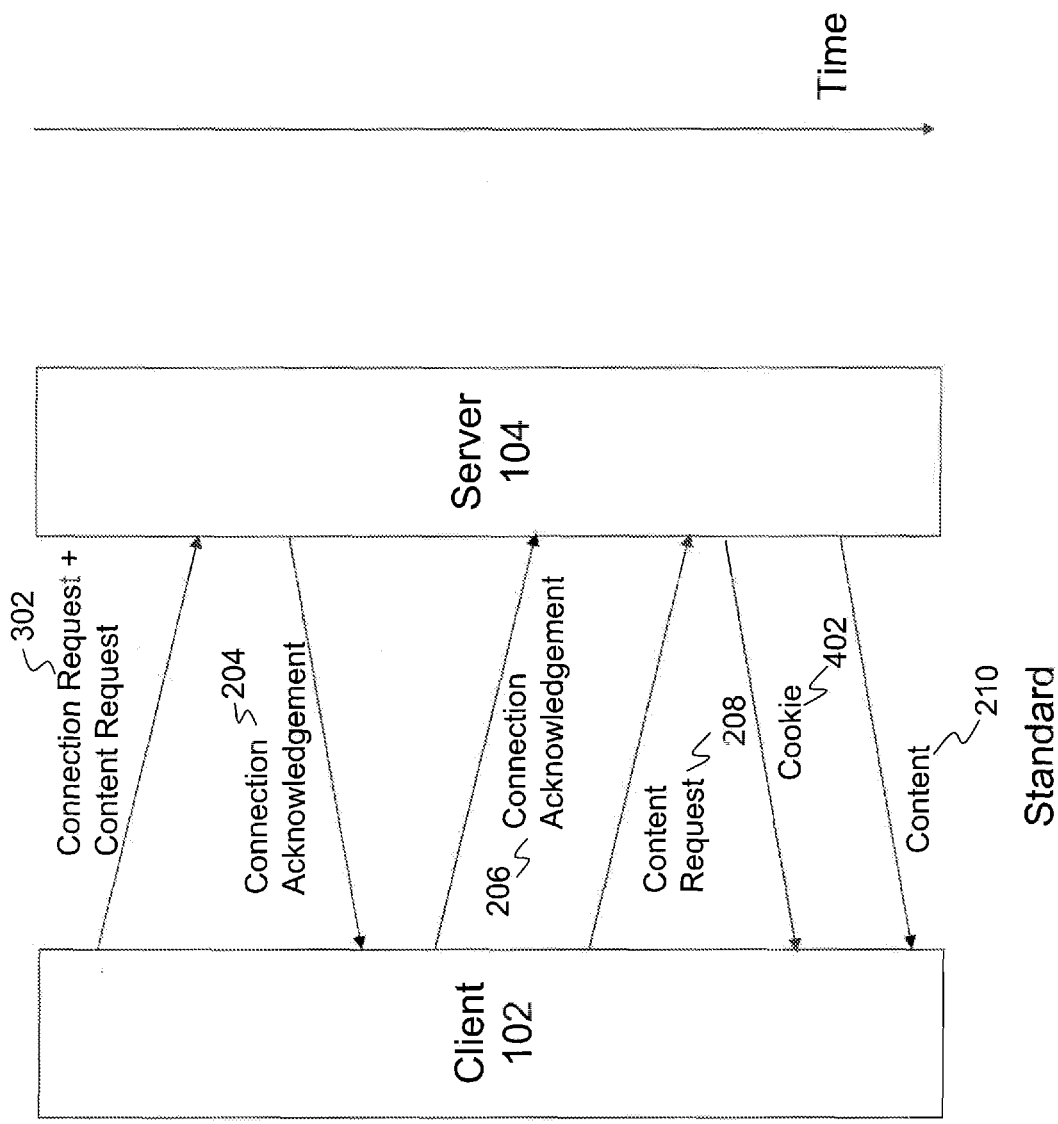
FIG. 4 illustrates a client server handshake protocol, according to an embodiment.

Turning to FIG. 4, when client 102 communicates with server 104 for the first time, client 102 sends a Connection+Content Request 302 to server 104. However, because server 104 has never communicated with client 102 before and does not know the identity of client 102, handshake optimization module 108 selects the "standard" mode of operation and server 104 does not address the content request (HTTP GET) contained in the Connection+Content Request 302. Instead, server 104 only acknowledges 204 (SYN-ACK) the connection request of the Connection+Content Request 302. A full handshake takes place according to traditional protocol operation, with client 102 receiving the connection acknowledgment 204 from server 104 and responding with its own connection acknowledgement 206. Client 102 may re-send the content request (HTTP GET) 208 to server 104 or server 104 may proceed to process the content request contained in the original Connection+Content Request 302. At this point, in addition to the Content 210, server 104 may issue a persistent cookie or the like 402 to the authenticated client, which client 102 will save for future use.

Optimized Mode of Operation

Figure 5:
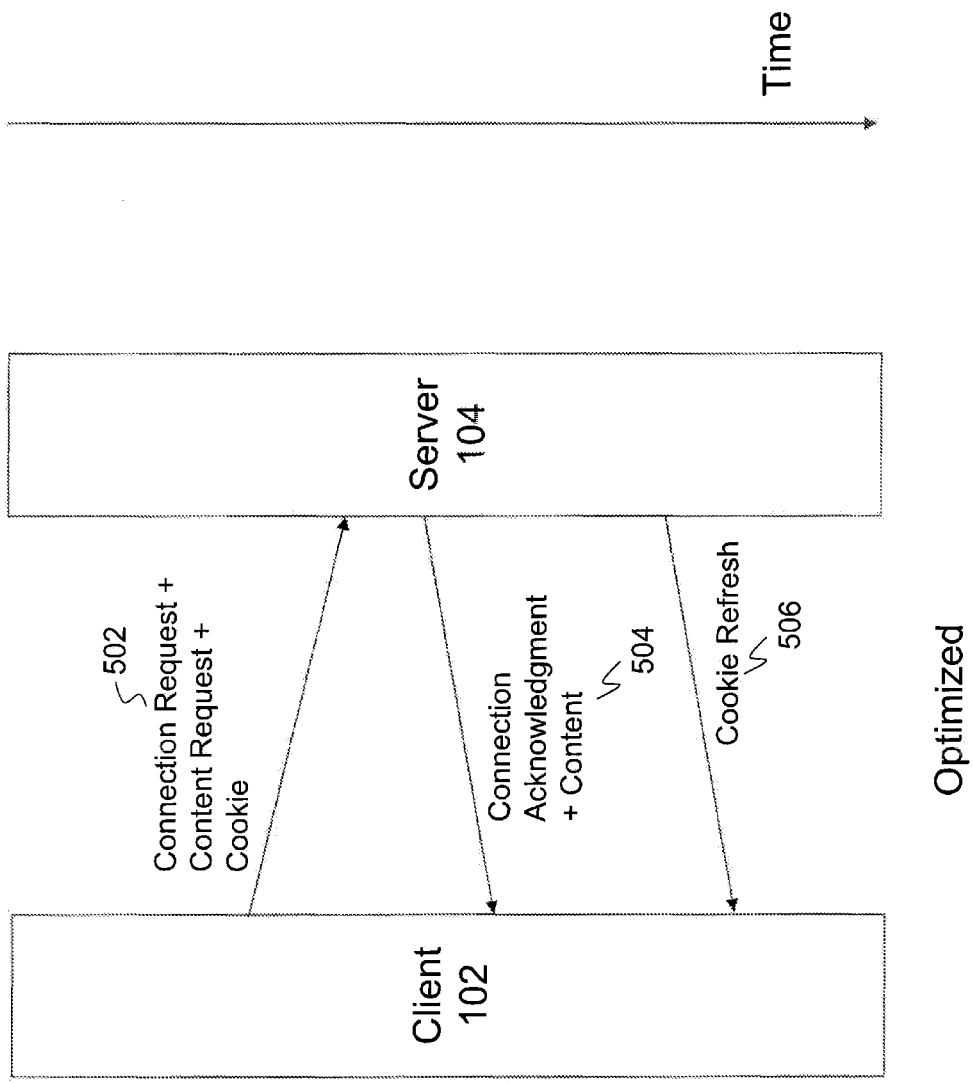
FIG. 5 illustrates a client server handshake protocol, according to an embodiment.

Turning to FIG. 5, the next time client 102 tries to connect to server 104 to, for example, download a web page, client 102 sends a connection request (SYN) 502 to server 104 containing a content request (HTTP GET) and the persistent cookie 402 issued to client 102 previously by server 104. The handshake optimization module 108, upon recognizing the persistent cookie 402 in the connection request 502, verifies or authenticates the validity of the persistent cookie 402 by, for example, comparing the received cookie against a database listing valid cookies 110 known to have been issued to clients. Handshake optimization module 108 then selects the "optimized" mode of operation for this connection and responds with the requested content immediately 504, without performing a handshake. In one embodiment, server 104 will additionally issues a new persistent cookie 506 to client 102 to refresh the cookie for security purposes.

In one embodiment, the persistent cookie 402 is a secure hash of several parameters. For example, cookie 402 may be a hash of client's IP address, current time, and a secret number kept by a security server. Using such parameters ensures that no one else can generate that cookie and that each issued cookie will be unique. The server can control the time period for which the cookie is valid. For example, for security purposes, the handshake optimization module 108 may allow cookies to remain valid for only one day, after which a connection handshake will have to take place and a new cookie issued before a client is allowed to operate in optimized mode again. Thus, if client 102 does not connect to server 104 for longer than the period of the cookie's validity, the state is effectively reset, and client 102 starts again as if it has never communicated with the server 104 before.

As a result, any client 102 operating in optimized mode gets the benefit of fast response from server 104 for all connections made to server 104, except the first one in which the connection operated in standard mode.

Figure 6:
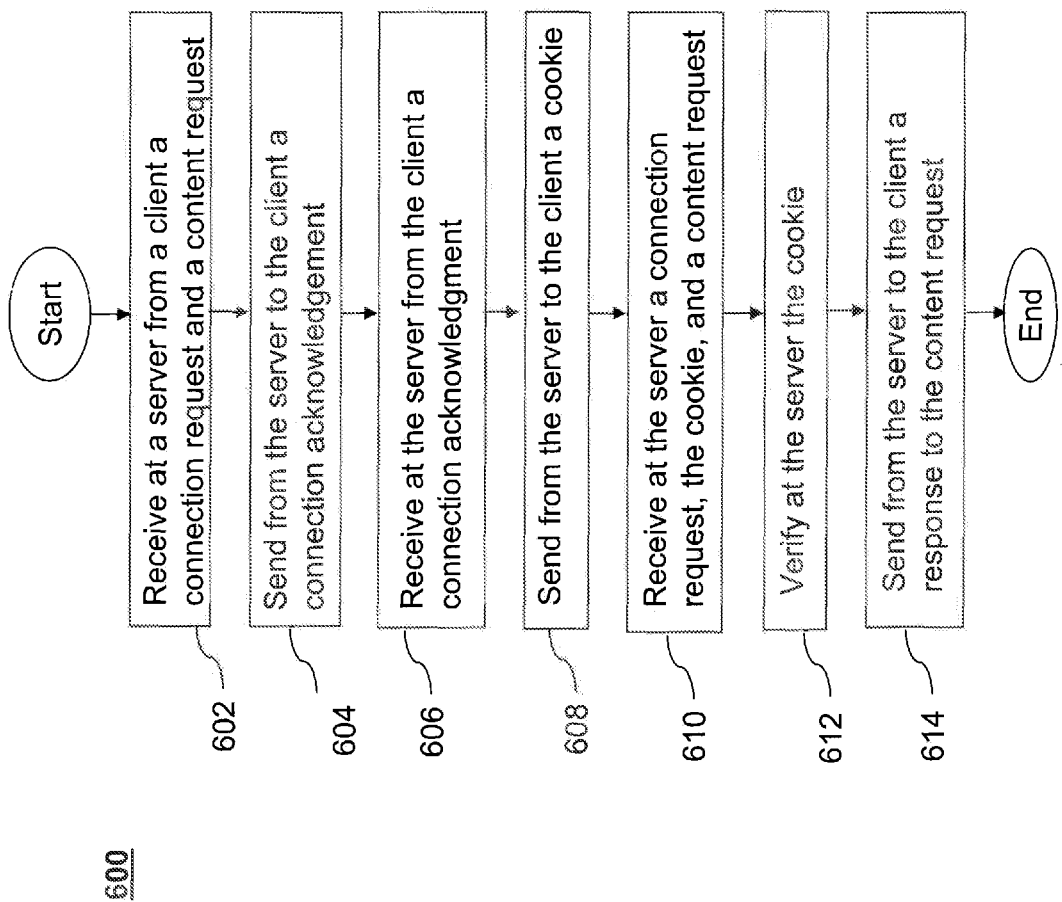
FIG. 6 is a flowchart illustrating an exemplary handshake operation mode.

FIG. 6 is a flow chart illustrating exemplary operations that may be performed in standard and optimized mode of operation according to one embodiment. In 602, a first connection request+content request is received at server 104 from client 102. For example, client 102 may send a SYN segment to server 104 requesting a connection according to TCP, wherein the SYN segment contains an HTTP GET request. In 604, server 104 responds to client 102 with a connection acknowledgment, but ignores the HTTP GET request. For example, server 104 may generate and send a SYN-ACK segment to client 102 according to TCP. In 606, a connection acknowledgement is received at server 104 from client 102. For example, client 102 may send an ACK segment to server 104 according to TCP. In 608, server 104 sends a persistent cookie to client 102. The cookie may be, for example, a persistent HTTP cookie. In 610, a subsequent connection+content request, the connection request, cookie, and content request are received at the server 104 from the client 102. For example, client 102 may include a web browser 112 having a connection controller 114 modified in accordance with the present disclosure. The connection controller 114 may generate a SYN segment in which an HTTP GET and the cookie are embedded. This modified SYN segment is sent to server 104. In 612, the cookie is verified at the server 104. In 614, if the cookie is a valid cookie, server 104 sends to client 102 the content requested. Thus, for the subsequent connection request of 610 and any subsequent connection requests, the handshake optimization module 108 can avoid the delay incurred by the handshake process and begin responding to content requests immediately upon receiving a SYN segment because the client has been authenticated.

Cookie Mode of Operation

An additional "cookie"-based mode of operation may be employed in some embodiments. This mode of operation is similar to "standard" mode, but in this case, server 104 additionally employs SYN cookies and, therefore, no resources are consumed at the server to keep track of connections. In particular, the use of SYN cookies allows server 104 to avoid maintaining a record entry or state for each client 102 connection. Rather than keeping a record of all SYN segments received from clients 102, server 104 instead sends back the SYN+ACK response to client 102 and discards any SYN record or state. The SYN+ACK segment contains an initial sequence number constructed by server 104. When client 102 sends back a TCP ACK segment in response to the SYN+ACK segment, client 102 modifies the initial sequence number in a known way and includes this modified number in the ACK segment. When server 104 receives the ACK segment response from client 102, server 104 can reconstruct the SYN record or state using the modified number contained in the received segment. The use of the SYN cookie mechanism allows server 104 to avoid maintaining a state for each client 102 resulting in no resource consumption at server 104 to maintain connection state. There is no need for the server to "remember" a client from the last time the client attempted to connect to the serve'.

Operation and Avoidance of Vulnerabilities

In one embodiment, the handshake optimization module 108 uses an algorithm where server 104 dedicates a predetermined amount of server resources to each of the three modes of operation discussed above. For example, the handshake optimization module 108 may allow for a maximum of 500 Connection+Content Requests 302 to be handled in optimized mode, a maximum of 1000 Connection+Content Requests 302 to be handled in standard mode, and the remainder Connection+Content Requests 302 to be handled in cookie mode.

Figure 7:
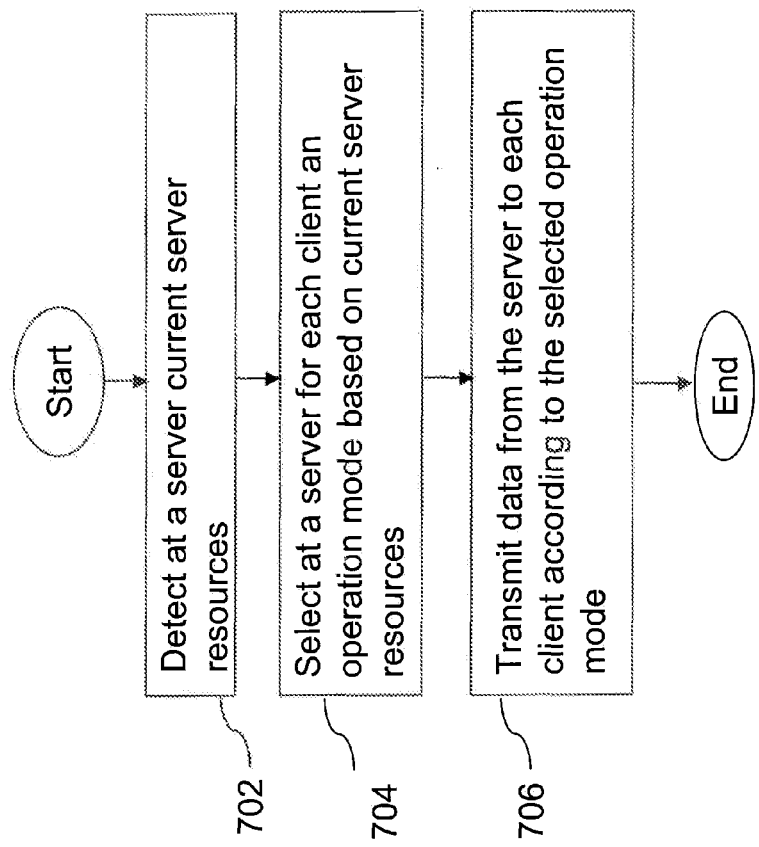
FIG. 7 is a flowchart illustrating an exemplary handshake operation mode.

FIG. 7 is a flow chart illustrating exemplary operations that may be performed when clients attempt to connect to the server. In 702, the handshake optimization module 108 detects at the server 104 the current state of server resources. In 704, for each incoming Connection+Content Request, handshake optimization module 108 selects an operation mode based on the detected state of server resources. For example, if the maximum number of allowable optimized mode connections have been made, the handshake optimization module 108 may select cookie-based operation mode for a current connection request. In 706, server 104 communicates with each client 102 according to the selected operation mode. In some embodiments, one of the disclosed operation modes may be a default operation mode.

Allocating a fixed amount of resources to each of the three modes of operation prevents server 104 from running out of resources when it is under attack. For example, if an attacker attempts a denial of service attack by sending 5000 Connection+Content Requests 302 to server 104, the handshake optimization module will only allow the first 500 requests, for example, to operate in optimized mode. The remaining requests may be handled using standard mode. In this way, during normal operation, clients benefit from the speed of operating without performing a handshake, but if the server comes under attack, the attacker is prevented from occupying all of the server resources such that legitimate traffic cannot be served.

Operation according to certain embodiments allow for an amplification attack to be avoided. Here, the problem is one where an attacker spoofs Connection+Content Requests 302 to cause the server to send large amount of traffic to an unsuspecting client. Because server 104 can employ modes of operation according to embodiments described herein, the server 104 can first authenticate the client using techniques disclosed herein. Thus, server 104 can proceed with delivering content to a recipient in an optimized mode, for example, with confidence that the Connection+Content Requests 302 is not spoofed and in fact originated from a client that it has communicated with before.

Example Computer Embodiment

Figure 8:
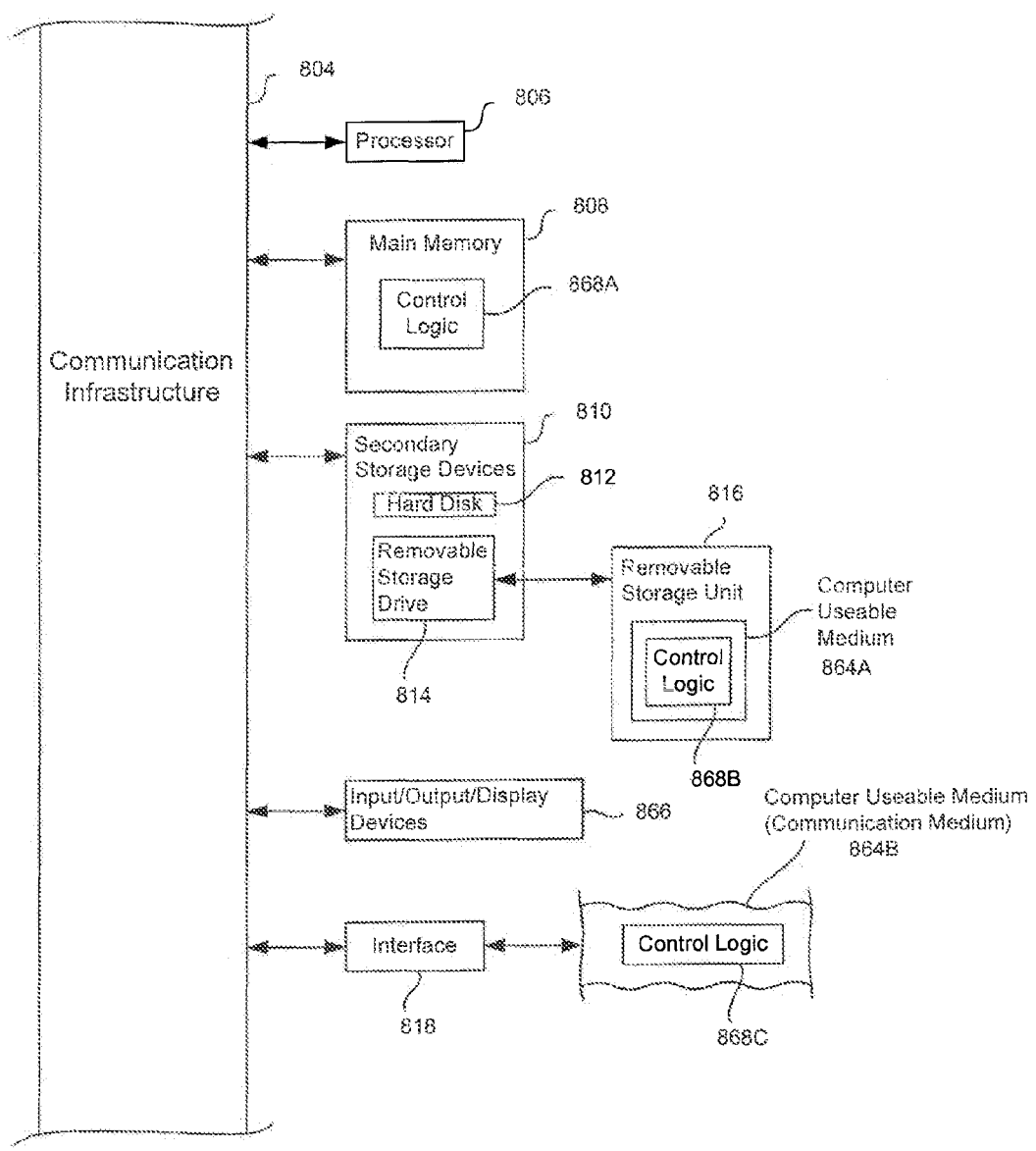
FIG. 8 illustrates an example computer useful for implementing components of the embodiments.

In an embodiment, the system and components of embodiments described herein are implemented using well known computers, such as example computer 802 shown in FIG. 8. For example, client 102 and server 104 can be implemented using computer(s) 802.

Computer 802 can be any commercially available and well known computer capable of performing the functions described herein, such as computers available from International Business Machines, Apple, Sun, HP, Dell, Compaq, Cray, etc. Computer 802 can also be any commercially available and well known tablet, mobile device or smart-phone capable of performing the functions described herein, such as devices available from Apple, HTC, RIM, Nokia, Sony, etc.

Computer 802 includes one or more processors (also called central processing units, or CPUs), such as a processor 806. Processor 806 is connected to a communication infrastructure 804.

Computer 802 also includes a main or primary memory 808, such as random access memory (RAM). Primary memory 808 has stored therein control logic 868A (computer software), and data.

Computer 802 also includes one or more secondary storage devices 810. Secondary storage devices 810 include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 864A having stored therein computer software 868B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 802 also includes input/output/display devices 866, such as monitors, keyboards, pointing devices, Bluetooth devices, etc.

Computer 802 further includes a communication or network interface 818. Network interface 818 enables computer 802 to communicate with remote devices. For example, network interface 818 allows computer 802 to communicate over communication networks or mediums 864B (representing a form of a computer useable or readable medium), such as LANs, WANs, the Internet, etc. Network interface 818 may interface with remote sites or networks via wired or wireless connections.

Control logic 868C may be transmitted to and from computer 802 via communication medium 864B.

Any tangible apparatus or article of manufacture comprising a computer useable or readable medium having control logic (software) stored therein is referred to herein as a computer program product or program storage device. This includes, but is not limited to, computer 802, main memory 808, secondary storage devices 810 and removable storage unit 816. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

CONCLUSION

It is to be appreciated that the Detailed Description section, and not the Brief Summary and Abstract sections, is intended to be used to interpret the claims. The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for reducing handshake delay in a server configured to communicate with one or more clients, the method comprising:
    selecting at the server for each of the one or more clients an operation mode, wherein the operation mode is selected from standard handshake operation mode or optimized handshake operation mode and the optimized handshake operation mode is selected for at least one of the one or more clients;
    receiving at the server a connection request containing a content request from one or more clients; and
    transmitting data from the server to one or more clients according to the selected operation mode, wherein when the selected operation mode is the standard handshake operation mode the server transmits acknowledgement of the connection request, and when the selected operation mode is the optimized handshake operation mode the server transmits acknowledgement of the connection request and content corresponding to the content request.

2. The method of claim 1, wherein the operation mode is selected from standard handshake operation mode, optimized handshake operation mode, or cookie-based handshake operation mode.

3. The method of claim 1, wherein transmitting data from the server includes transmitting a cookie to the client when the selected handshake operation mode is standard handshake operation mode.

4. The method of claim 2, wherein the cookie-based handshake operation mode utilizes a SYN cookie.

5. The method of claim 2, wherein the standard handshake operation mode, the optimized handshake operation mode, or the cookie-based handshake operation mode is a default operation mode.

6. The method of claim 1, further comprising measuring server resources and selecting for each of the one or more clients the operation mode based on one or more measured server resources.

7. The method of claim 6, wherein the one or more measured server resources is number of connections, server load, or server response time.

8. The method of claim 1, wherein said selecting at the server for each of the one or more clients an operation mode is based on one or more detected network attacks.

9. The method of claim 8, wherein the one or more detected network attacks is a denial of service attack or an amplification attack.

10. A computer server system for reducing handshake delay when communicating with one or more clients, the computer server system comprising:
    a handshake optimization module configured to:
    select, for each of the one or more clients, an operation mode, wherein the operation mode is selected from standard handshake operation mode or optimized handshake operation mode and the optimized handshake operation mode is selected for at least one of the one or more clients;
    receive a connection request containing a content request from one or more clients; and
    transmit data to one or more clients according to the selected operation mode, wherein when the selected operation mode is the standard handshake operation mode the server transmits acknowledgement of the connection request, and when the selected operation mode is the optimized handshake operation mode the server transmits acknowledgement of the connection request and content corresponding to the content request;
    at least one computer processor configured to execute the handshake optimization module; and
    at least one memory unit configured to store the handshake optimization module.

11. The system of claim 10, wherein the handshake optimization module is further configured select the operation mode from one of standard handshake operation mode, optimized handshake operation mode, or cookie-based handshake operation mode.

12. The system of claim 10, wherein the handshake optimization module is further configured to transmit a cookie to the client when the selected handshake operation mode is the standard handshake operation mode.

13. The system of claim 11, wherein the handshake optimization module is further configured to utilize a SYN cookie when the selected handshake operation mode is the cookie-based handshake operation mode.

14. The system of claim 11, wherein the handshake optimization module is further configured to utilize any one of the standard handshake operation mode, the optimized handshake operation mode, or the cookie-based handshake operation mode as a default operation mode.

15. The system of claim 10, wherein the handshake optimization module is further configured to select the operation mode based on one or more measured server resources.

16. The system of claim 15, wherein the handshake optimization module is further configured to measure one or more server resources based on a number of connections, server load, or server response time.

17. The system of claim 10, wherein the handshake optimization module is further configured to select an operation mode based on one or more detected network attacks.

18. The system of claim 17, wherein the one or more detected network attacks is a denial of service attack or an amplification attack.

19. A tangible computer program product comprising a non-transitory computer readable medium having computer program logic recorded thereon for causing at least one processor to:
    select, for each of the one or more clients, an operation mode, wherein the operation mode is selected from standard handshake operation mode or optimized handshake operation mode and the optimized handshake operation mode is selected for at least one of the one or more clients;

receive a connection request containing a content request from one or more clients; and transmit data to one or more clients according to the selected operation mode, wherein when the selected operation mode is the standard handshake operation mode the server transmits acknowledgement of the connection request, and when the selected operation mode is the optimized handshake operation mode the server transmits acknowledgement of the connection request and content corresponding to the content request.

\* \* \* \* \*